United States Patent
Tong et al.

(10) Patent No.: US 10,634,855 B2
(45) Date of Patent: Apr. 28, 2020

(54) ALIGNMENT SYSTEM AND METHOD FOR CALIBRATING POSITION OF OPTICAL FIBER BORE FERRULE

(71) Applicant: CommScope Telecommunications (Shanghai) Co. Ltd., Shanghai (CN)

(72) Inventors: Zhaoyang Tong, Shanghai (CN); Lei Liu, Shanghai (CN); Lin Lin, Shanghai (CN)

(73) Assignee: COMMSCOPE TELECOMMUNICATIONS (SHANGHAI) CO. LTD., Shanghai (CN)

( * ) Notice: Subject to any disclaimer, the term of this patent is extended or adjusted under 35 U.S.C. 154(b) by 111 days.

(21) Appl. No.: 15/111,742

(22) PCT Filed: Jan. 6, 2015

(86) PCT No.: PCT/IB2015/050167
§ 371 (c)(1),
(2) Date: Jul. 14, 2016

(87) PCT Pub. No.: WO2015/107440
PCT Pub. Date: Jul. 23, 2015

(65) Prior Publication Data
US 2016/0377818 A1    Dec. 29, 2016

(30) Foreign Application Priority Data
Jan. 14, 2014   (CN) .......................... 2014 1 0058782

(51) Int. Cl.
*G02B 6/38*   (2006.01)
*G01M 11/00*   (2006.01)
*H04N 5/247*   (2006.01)

(52) U.S. Cl.
CPC .......... *G02B 6/3843* (2013.01); *G01M 11/37* (2013.01); *G02B 6/3874* (2013.01); *H04N 5/247* (2013.01)

(58) Field of Classification Search
CPC .... G02B 6/3843; G02B 6/3874; H04N 5/247; G01M 11/37
See application file for complete search history.

(56) References Cited

U.S. PATENT DOCUMENTS

| 4,506,947 A | 3/1985 | Tatekura et al. |
| 4,815,811 A | 3/1989 | Crosnier et al. |

(Continued)

FOREIGN PATENT DOCUMENTS

| DE | 3833275 A1 | 4/1990 |
| EP | 0800039 A1 | 11/1998 |

(Continued)

OTHER PUBLICATIONS

International Search Report for International Application No. PCT/IB2015/050167 dated Apr. 10, 2015 (2 pages).

*Primary Examiner* — Daniel Petkovsek
(74) *Attorney, Agent, or Firm* — Merchant & Gould P.C.

(57) ABSTRACT

The present invention discloses an alignment system for calibrating a position of an optical fiber in a bore of a ferrule, comprising: an outer cylinder alignment element for calibrating a center position of an outer cylinder of the ferrule, so that the center of the outer cylinder of the ferrule is aligned with a center of the outer cylinder alignment element; a fiber core alignment element comprising a fiber core having a center aligned with the center of the outer cylinder alignment element; an optical vision system for identifying a center position of a fiber core of the optical fiber and the center position of the fiber core of the fiber core alignment element; and a controlling and moving system for actively (Continued)

adjusting the position of the optical fiber in the bore of the ferrule under the guide of the optical vision system.

16 Claims, 6 Drawing Sheets

(56) References Cited

U.S. PATENT DOCUMENTS

| | | | | |
|---|---|---|---|---|
| 5,011,259 | A * | 4/1991 | Lieber | G01B 11/272 |
| | | | | 385/55 |
| 5,729,622 | A * | 3/1998 | Csipkes | G02B 6/3807 |
| | | | | 356/73.1 |
| 6,011,616 | A * | 1/2000 | Volcy | G01B 11/272 |
| | | | | 356/73.1 |
| 9,372,304 | B2 * | 6/2016 | Bradley | G02B 6/3885 |
| 9,442,005 | B2 * | 9/2016 | Fusco | G01J 1/30 |
| 9,612,177 | B2 * | 4/2017 | Clarke | G01M 11/33 |
| 10,215,927 | B2 * | 2/2019 | Tong | G02B 6/3843 |
| 2016/0061690 | A1 * | 3/2016 | Elkins, II | G01M 11/33 |
| | | | | 356/73.1 |
| 2016/0334583 | A1 * | 11/2016 | Tong | G02B 6/3843 |

FOREIGN PATENT DOCUMENTS

| | | | | |
|---|---|---|---|---|
| JP | | S56-66702 A | 6/1981 | |
| WO | WO 2014195893 A1 * | | 12/2014 | G02B 6/3843 |

* cited by examiner

ALIGNMENT SYSTEM AND METHOD FOR CALIBRATING POSITION OF OPTICAL FIBER BORE FERRULE

CROSS-REFERENCE TO RELATED APPLICATION

This application is a National Stage Application of PCT/IB2015/050167, filed 9 Jan. 2015, which claims benefit of Serial No. 201410015878.2, filed 14 Jan. 2014 in China and which applications are incorporated herein by reference. To the extent appropriate, a claim of priority is made to each of the above disclosed applications.

BACKGROUND OF THE INVENTION

Field of the Invention

The present invention relates to an alignment system and a method for calibrating a position of an optical fiber in a bore of a ferrule, a fiber optic ferrule assembly and a fiber optic connector manufactured by the alignment system and the calibrating method.

Description of the Related Art

A ferrule for a fiber optic connector is a high precision element manufactured by a precise machining technology, and the ferrule is a core component of the fiber optic connector. In prior art, steps of manufacturing the fiber optic connector generally comprises: obtaining a bare fiber by peeling an optical cable and cleaning the bare fiber; inserting the bare fiber through a bore of the ferrule in which gel is prefilled; curing the gel to fix the bare fiber in the bore of the ferrule; and processing the ferrule and the fiber by grinding, polishing, testing, etc., to form a ferrule assembly. A manufacturing error is unavoidable during manufacturing the ferrule assembly. Furthermore, a personal error may occur in size for easily fitting/assembling the ferrule assembly, for example, in order to easily insert the fiber through the bore of the ferrule, the diameter of the bore of the ferrule is formed to be larger than the outer diameter of the fiber, causing a size deviation between the outer diameter of the fiber and the diameter of the bore. Thereby, it is likely to occur various errors in the ferrule assembly, for example, a center axis of the fiber is offset from a center axis of the bore of ferrule, a position of the bore is offset from an ideal position of the bore determined with reference to an indexing feature (for example, an outer cylinder of a single-fiber ferrule or a guide hole of a multi-fiber ferrule). As a result, an actual center axis of the fiber in the bore of the ferrule may be offset from an ideal center axis of the fiber determined with reference to the indexing feature of the ferrule due to these errors, increasing the insertion loss of coupling a pair of fiber optic connectors and decreasing the optical transmission performance of the fiber optic connectors.

A mode field diameter of a single-mode fiber is much less than a mode field diameter of a multi-mode fiber. Generally, the mode field diameter of the single-mode fiber is equal to about ⅕ or ⅙ of the mode field diameter of the multi-mode fiber. Thereby, the alignment accuracy of the single-mode fiber is required to be much higher than that of the multi-mode fiber. Accordingly, the precision of the ferrule for the single-mode fiber optic connector is much higher than that of the ferrule for the multi-mode fiber optic connector.

Accordingly, in prior art, in order to ensure the single-mode fiber optic connector to satisfy with standard precision requirements in this art, it is necessary to use the high precision single-mode ferrule to manufacture the high precision single-mode fiber optic connector, and it is impossible to use the low precision multi-mode ferrule to manufacture the high precision single-mode fiber optic connector. That is, during manufacturing the high precision single-mode fiber optic connector, it is necessary to differentiate the high precision single-mode ferrule and the low precision multi-mode ferrule. Although the single-mode single bore ferrule and the multi-mode single bore ferrule both have the same outer appearance and almost the same in structure, the single-mode single bore ferrule has a much higher precision requirement than that of the multi-mode single bore ferrule. For example, for the single-mode single bore ferrule, the requirement on centricity between the bore of ferrule and the outer cylinder of the ferrule is very high, generally required to reach within 1.5 µm, or even required to less than 1 µm for the single-mode fiber optic connector with an ultralow insertion loss. As a result, the single-mode single bore ferrule has a high cost/price, and it directly causes the cost of the single-mode fiber optic connector very high, especially for the single-mode fiber optic connector with an ultralow insertion loss, the cost of the single-mode single bore ferrule may be times higher than that of the multi-mode single bore ferrule.

The precision requirements on the single-mode single-bore ferrule mainly comprise: a high size precision on the diameter of the bore of the ferrule, a high size precision on the concentricity between the bore and the outer cylinder of the ferrule. Hereafter, it will compare the single-mode single-bore ferrule and the multi-mode single-bore ferrule on following precision requirements.

1) Dimensional tolerance on the outer cylinder of the ferrule.

For the single-mode ferrule, the dimensional tolerance of the outer cylinder of the ferrule is generally required to reach about a range of −0.0005 mm~0.0005 mm.

For the multi-mode ferrule, the dimensional tolerance of the outer cylinder of the ferrule is generally required to reach about a range of −0.001 mm~0.001 mm.

2) Dimensional tolerance on the diameter of the bore of the ferrule.

For the single-mode ferrule, the dimensional tolerance of the diameter of the bore of the ferrule is generally required to reach about a range of 0.000~0.001 mm, or even required to reach about a range of 0.0000~0.0005 mm for a low insertion loss single-mode ferrule.

For the multi-mode ferrule, the dimensional tolerance of the diameter of the bore of the ferrule is generally required to reach about a range of 0.000~0.004 mm.

3) Concentricity between the fiber and the outer cylinder of the ferrule.

For the single-mode ferrule, the concentricity between the fiber and the outer cylinder of the ferrule is generally required to reach about 0.001 mm, or even required to reach about 0.0005 mm for a low insertion loss single-mode ferrule.

For the multi-mode ferrule, the concentricity between the fiber and the outer cylinder of the ferrule is generally required to reach about 0.004 mm.

In order to overcome the above problems in the prior art, the applicant of the present invention once proposed a solution in which the high precision single-mode fiber optic connector can be manufactured by using the low precision multi-mode ferrule (with a large bore diameter and a large eccentric), instead of using the expensive high precision single-mode ferrule. The solution simplifies the production, decreases the cost, and improves the optical performance (for example, decreasing the low insertion loss) of the high precision single-mode fiber optic connector.

In the solution provided by the applicant before, the single-mode fiber protruding from the ferrule is introduced into a high precision indexing tool, so that a center of a coating layer on the single-mode fiber is aligned with a center of a high precision alignment bore in the indexing tool. After being aligned, the single-mode fiber is fixed in the bore of the low precision multi-mode ferrule. In this way, a high precision single-mode optic ferrule assembly or connector can be manufactured by using the low precision multi-mode ferrule.

However, this solution is achieved by aligning the center of the coating layer on the fiber, instead of aligning a center of a fiber core of the fiber. Thereby, in this solution, there is a prerequisite that the coating layer and the fiber core of the fiber must have good concentricity. Unfortunately, an eccentric error is unavoidable between the coating layer and the fiber core of the fiber during manufacturing the fiber. The eccentric error is random and cannot be controlled in the practice. For example, different batches of fibers may have different eccentric errors, even the same batch of fibers may have different eccentric errors, and the fibers from different manufactures may have different eccentric errors. Furthermore, there may be contaminants, for example, particles/dusts, attached on the surface of the coating layer of the fiber. As a result, in this solution provided by the applicant before, it cannot ensure that the center of the fiber core of the fiber is aligned in the highest precision. Concerning this, the present invention is proposed.

SUMMARY OF THE INVENTION

The present invention has been made to overcome or alleviate at least one aspect of the above mentioned disadvantages.

According to an object of the present invention, there is provided an alignment system and a method for calibrating a position of an optical fiber in a bore of a ferrule, so that a center of a fiber core of the optical fiber is aligned with a center of an outer cylinder of the ferrule, reducing a radial deviation between the center of the fiber core of the optical fiber and the center of the outer cylinder of the ferrule, and eliminating the insertion loss of the ferrule.

According to an aspect of the present invention, there is provided an alignment system for calibrating a position of an optical fiber in a bore of a ferrule, comprising: an outer cylinder alignment element for calibrating a center position of an outer cylinder of the ferrule, so that the center of the outer cylinder of the ferrule is aligned with a center of the outer cylinder alignment element; a fiber core alignment element comprising a fiber core having a center aligned with the center of the outer cylinder alignment element; an optical vision system for identifying a center position of a fiber core of the optical fiber and the center position of the fiber core of the fiber core alignment element; and a controlling and moving system for actively adjusting the position of the optical fiber in the bore of the ferrule under the guide of the optical vision system, so that the center of the fiber core of the optical fiber is aligned with the center of the fiber core of the fiber core alignment element, and so that the center of the fiber core of the optical fiber is aligned with the center of the outer cylinder of the ferrule.

According to an exemplary embodiment of the present invention, the alignment system further comprises a calibration ferrule having a bore in which the fiber core alignment element is fixed.

According to another exemplary embodiment of the present invention, the outer cylinder alignment element is configured to be an alignment sleeve; and the calibration ferrule and the ferrule are inserted into the alignment sleeve from both ends thereof, respectively.

According to another exemplary embodiment of the present invention, the optical vision system at least comprises: a first imaging device configured to pick up a first image of the optical fiber and the fiber core alignment element in a first direction perpendicular to a center axis of the outer cylinder alignment element; a second imaging device configured to pick up a second image of the optical fiber and the fiber core alignment element in a second direction perpendicular to the center axis of the outer cylinder alignment element and the first direction; and an image recognition device configured to recognize the center position of the fiber core of the optical fiber and the center position of the fiber core of the fiber core alignment element in the first image and recognize the center position of the fiber core of the optical fiber and the center position of the fiber core of the fiber core alignment element in the second image.

According to another exemplary embodiment of the present invention, the first imaging device comprises: a first light source provided at one side of the outer cylinder alignment element in the first direction; and a first camera provided at the other side, opposite to the first light source, of the outer cylinder alignment element in the first direction.

According to another exemplary embodiment of the present invention, the second imaging device comprises: a second light source provided at one side of the outer cylinder alignment element in the second direction; and a second camera provided at the other side, opposite to the second light source, of the outer cylinder alignment element in the second direction.

According to another exemplary embodiment of the present invention, the image recognition device comprises an image processing system for processing the first image and the second image.

According to another exemplary embodiment of the present invention, an end of the optical fiber protrudes from an end surface of the ferrule, and an end of the fiber core alignment element protrudes from an end surface of the calibration ferrule, and faces and is spaced from the end of the optical fiber.

According to another exemplary embodiment of the present invention, the first imaging device and the second imaging device are configured to pick up images of the ends, facing to and spaced from each other, of the optical fiber and the fiber core alignment element.

According to another exemplary embodiment of the present invention, a light transmission window is formed on a peripheral wall of the outer cylinder alignment element, so that lights emitted from the first and second light sources transmit through the outer cylinder alignment element and are received by the first and second cameras, respectively.

According to another exemplary embodiment of the present invention, the outer cylinder alignment element is made of transparent material, so that lights emitted from the first and second light sources transmit through the outer cylinder alignment element and are received by the first and second cameras, respectively.

According to another exemplary embodiment of the present invention, the controlling and moving system comprises: a manipulator having a gripper for gripping the optical fiber; and a closed loop feedback control system configured to adjust a position of the gripper until an error, detected by the optical vision system, between the center position of the fiber core of the optical fiber and the center position of the fiber core of the fiber core alignment element is equal to zero or within a predetermined range.

According to another exemplary embodiment of the present invention, the predetermined range is a range of −0.001 mm~0.001 mm.

According to another exemplary embodiment of the present invention, the predetermined range is a range of −0.3 μm~0.3 μm.

According to another aspect of the present invention, there is provided a method of calibrating a position of an optical fiber in a bore of a ferrule, comprising steps of:

providing an outer cylinder alignment element and a fiber core alignment element, wherein a center of a fiber core of the fiber core alignment element is aligned with a center of the outer cylinder alignment element;

calibrating a center position of an outer cylinder of the ferrule with the outer cylinder alignment element, so that a center of the outer cylinder of the ferrule is aligned with the center of the outer cylinder alignment element; and actively adjusting the position of the optical fiber in the bore of the ferrule under the guide of an optical vision system, so that a center of a fiber core of the optical fiber is aligned with the center of the fiber core of the fiber core alignment element.

According to an exemplary embodiment of the present invention, the optical vision system at least comprises: a first imaging device configured to pick up a first image of the optical fiber and the fiber core alignment element in a first direction perpendicular to a center axis of the outer cylinder alignment element; a second imaging device configured to pick up a second image of the optical fiber and the fiber core alignment element in a second direction perpendicular to the center axis of the outer cylinder alignment element and the first direction; and an image recognition device configured to recognize the center position of the fiber core of the optical fiber and the center position of the fiber core of the fiber core alignment element in the first image and recognize the center position of the fiber core of the optical fiber and the center position of the fiber core of the fiber core alignment element in the second image.

According to another exemplary embodiment of the present invention, the position of the optical fiber in the bore of the ferrule is actively adjusted by a controlling and moving system; and the controlling and moving system comprises: a manipulator having a gripper for gripping the optical fiber; and a closed loop feedback control system configured to adjust a position of the gripper until an error, detected by the optical vision system, between the center position of the fiber core of the optical fiber and the center position of the fiber core of the fiber core alignment element is equal to zero or within a predetermined range.

According to another exemplary embodiment of the present invention, the error comprises: a first error, detected by the optical vision system, between the center position of the fiber core of the optical fiber and the center position of the fiber core of the fiber core alignment element in the first image; and a second error, detected by the optical vision system, between the center position of the fiber core of the optical fiber and the center position of the fiber core of the fiber core alignment element in the second image.

According to another aspect of the present invention, there is provided an alignment system for calibrating a position of an optical fiber in a bore of a ferrule, comprising:

a fiber core alignment element comprising a fiber core having a center positioned at a theoretical center relative to a positioning reference of the ferrule;

an optical vision system for identifying a center position of a fiber core of the optical fiber and a center position of the fiber core of the fiber core alignment element; and a controlling and moving system for actively adjusting the position of the optical fiber in the bore of the ferrule under the guide of the optical vision system, so that the center of the fiber core of the optical fiber is aligned with the center of the fiber core of the fiber core alignment element.

According to another aspect of the present invention, there is provided a method of calibrating a position of an optical fiber in a bore of a ferrule, comprising steps of:

providing a fiber core alignment element comprising a fiber core having a center positioned at a theoretical center relative to a positioning reference of the ferrule; and actively adjusting the position of the optical fiber in the bore of the ferrule under the guide of an optical vision system, so that a center of a fiber core of the optical fiber is aligned with the center of the fiber core of the fiber core alignment element.

The present invention relates to a technical field of fiber optic connector, and is different from the solution, in which the center of the coating layer on the fiber is aligned by the high precision indexing tool, provided by the applicant before. In the embodiments of the present invention, the position of the optical fiber in the bore of the ferrule is actively adjusted, under the guide of the optical vision system, by means of a controlling and moving system. As a result, the center of the fiber core of the optical fiber is aligned with the center of the outer cylinder of the ferrule. Thereby, a high precision fiber optic ferrule assembly and connector can be manufactured by a low precision fiber optic ferrule (with larger bore and eccentricity than the standard fiber optic ferrule). In this way, the embodiments of the present invention simplify the production, reduce the cost, and decrease the low insertion loss of the fiber optic connector. The embodiments of the present invention even can achieve a fiber optic connector without any insertion loss.

In the solution, in which the center of the coating layer on the fiber is aligned by the high precision indexing tool, provided by the applicant before, there is a prerequisite that the coating layer and the fiber core of the fiber must have good concentricity. Unfortunately, an eccentric error is unavoidable between the coating layer and the fiber core of the fiber during manufacturing the fiber. The eccentric error is random and cannot be controlled in the practice. For example, different batches of fibers may have different eccentric errors, even the same batch of fibers may have different eccentric errors, and the fibers from different manufactures may have different eccentric errors. Furthermore, there may be contaminants, for example, particles/dusts, attached on the surface of the coating layer of the fiber. As a result, in this solution provided by the applicant before, it cannot ensure that the center of the fiber core of the fiber is aligned in the highest precision.

The present invention is different from the solution provided by the applicant before in that: in the embodiments of the present invention, the center of the fiber core of the fiber is recognized with the optical vision system, and then the controlling and moving system actively adjusts the center position of the fiber core of the fiber until the center of the fiber core of the fiber is aligned with the center of the fiber core of the fiber core alignment element fixed in the high precision single-mode ferrule. The fiber core alignment element protrudes from the high precision single-mode ferrule by a predetermined length, and the eccentric error of the center of the fiber core of the fiber core alignment element with respect to the center of the outer cylinder of the ferrule can be controlled within nanometers, or even to be equal to zero. In this way, by image recognizing the center of the fiber core of the fiber, instead of the center of the coating layer on the fiber, the embodiments of the present invention can eliminating the random eccentric error of the coating layer and the fiber core, the random diameter error of the coating layer, and other errors due to various conditions, for example, a bad end state of the ferrule, or contaminants attached on the coating layer. In the embodiments of the present invention, the alignment precision may reach the order of nanometers. After being aligned, the fiber is fixed in the low precision ferrule. Then, the ferrule is taken down from the alignment system, and the end surface of the ferrule is processed. Thereafter, the ferrule is assembled into the housing of the connector, and the performance of which is tested. In this way, by actively adjusting the position of the fiber, the fiber is aligned in the high precision, and the high precision fiber optic connector with low cost and ultra-low insertion loss can be obtained.

As for the single-fiber optic connector, the alignment system comprises a high precision outer cylinder alignment element, a high precision ferrule assembly containing a fiber core alignment element (the fiber core alignment element protrudes from the single-mode ferrule by a predetermined length, and fixed in the single-mode ferrule in high precision, that is, the eccentricity of the center of the fiber core with respect to the center of the outer cylinder of the single-mode ferrule is within the order of nanometers, or even reaches zero) and a fiber core profile vision alignment system. The alignment system aligns the outer cylinder of the low precision ferrule to the outer cylinder of the high precision single-mode calibration ferrule containing the fiber core alignment element. Then, the outer cylinder of the low precision ferrule is used as the alignment reference. Thereafter, the alignment system actively aligns the fiber core of the optical fiber in the bore of the low precision ferrule to the fiber core of the fiber core alignment element fixed in the high precision single-mode ferrule assembly, so as to adjust the deviations between the axial centers of the fiber cores in a two dimensional plane perpendicular to the axial center, and control the deviations within the order of nanometers.

In the embodiments of the present invention, the position precision of the fiber in the bore of the ferrule may be controlled, predicted, and repeated. It may reduce or even eliminate various disadvantageous effects due to the random error of the diameter of the coating layer, the random error of different batches of fibers, the random eccentric error between the coating layer and the fiber core. Thereby, the embodiments of the present invention improve the optical performance and the random matching performance of the fiber optic connectors, that is, the coupled fiber optic connectors have ultra-low insertion loss and ultra-low matching insertion loss.

In the present invention, by actively calibrating the fiber core of the fiber, a single-mode fiber optic connector with low cost, high precision and low insertion loss may be manufactured by the low precision ferrule.

Although the present invention is discussed herein by using the low precision ferrule to manufacture the single-mode fiber optic connector with ultra-low insertion loss, the present invention is also adapted to manufacture a multi-mode fiber optic connector with ultra-high precision and ultra-low insertion loss by using the low precision ferrule, and this case is also in the protection scope of the present invention.

Although the present invention is discussed herein by taking the single-bore fiber optic connector as an example, the present invention also is adapted to manufacture a multi-bore fiber optic connector by the technology disclosed herein, and this case is also in the protection scope of the present invention.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
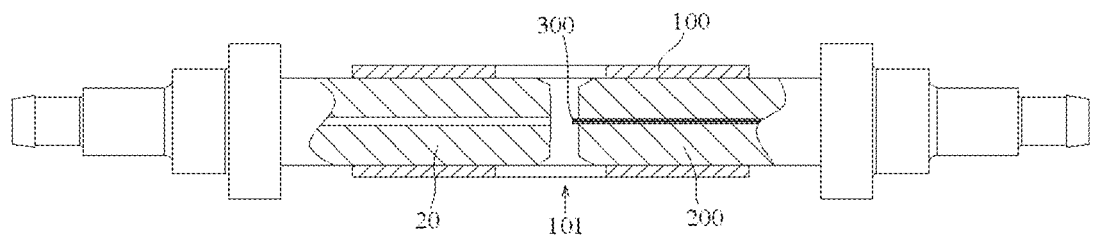
FIG. 1 is an illustrative view of a high precision outer cylinder alignment element and a high precision fiber core alignment element of an alignment system according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided an alignment system for calibrating a position of an optical fiber in a bore of a ferrule, comprising: an outer cylinder alignment element for calibrating a center position of an outer cylinder of the ferrule, so that the center of the outer cylinder of the ferrule is aligned with a center of the outer cylinder alignment element; a fiber core alignment element comprising a fiber core having a center aligned with the center of the outer cylinder alignment element; an optical vision system for identifying a center position of a fiber core of the optical fiber and the center position of the fiber core of the fiber core alignment element; and a controlling and moving system for actively adjusting the position of the optical fiber in the bore of the ferrule under the guide of the optical vision system, so that the center of the fiber core of the optical fiber is aligned with the center of the fiber core of the fiber core alignment element, and so that the center of the fiber core of the optical fiber is aligned with the center of the outer cylinder of the ferrule.

In an exemplary embodiment of the present invention, there is disclosed an alignment system for calibrating a position of an optical fiber 30 in a bore 21 of a ferrule 20. As shown in FIGS. 1-8, the alignment system mainly comprises: an outer cylinder alignment element 100 for calibrating a center position of an outer cylinder of the ferrule 20, so that the center of the outer cylinder of the ferrule 20 is aligned with a center of the outer cylinder alignment element 100; a high precision fiber core alignment element 300 comprising a fiber core 302 having a center aligned with the center of the outer cylinder alignment element 100; an optical vision system for identifying a center position of a fiber core 32 of the optical fiber 30 and the center position of the fiber core 302 of the fiber core alignment element 300; and a controlling and moving system for actively adjusting the position of the optical fiber 30 in the bore 21 of the ferrule 20 under the guide of the optical vision system, so that the center of the fiber core 32 of the optical fiber 30 is aligned with the center of the fiber core 302 of the fiber core alignment element 300, and so that the center of the fiber core 32 of the optical fiber 30 is aligned with the center of the outer cylinder of the ferrule 20

Please be noted that the term "high precision" herein means a precision higher or equal to a precision required in an industry standard of fiber optic connector. However, since the precision required in the industry standard of fiber optic connector may be changed with the times, the high precision herein is not limited to a specific value or a specific value range, and may be changed with the times.

Figure 3:
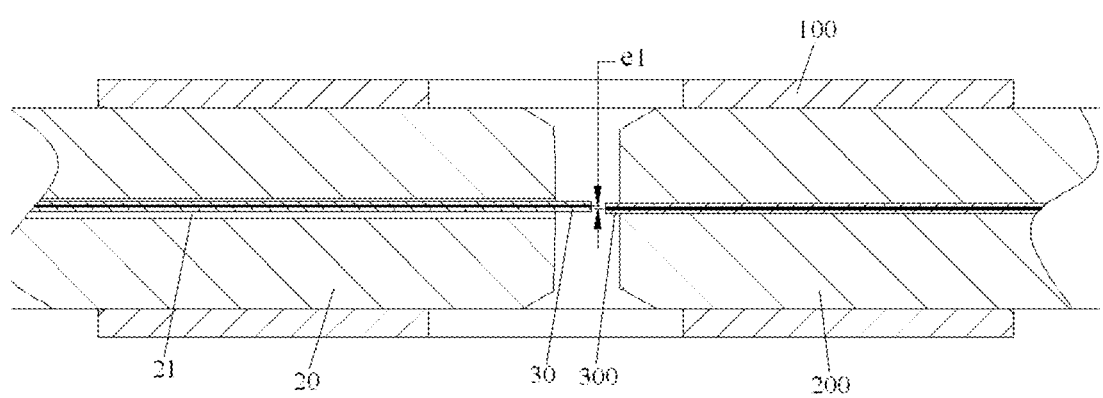
FIG. 3 is a vertical longitudinal cross section view of a ferrule to be manufactured with an optical fiber therein after being inserted into the high precision outer cylinder alignment element of FIG. 1.

FIG. 1 is an illustrative view of a high precision outer cylinder alignment element 100 and a high precision fiber core alignment element 300 of an alignment system according to an exemplary embodiment of the present invention; FIG. 3 is a vertical longitudinal cross section view of a ferrule 20 to be manufactured with an optical fiber 30 after being inserted into the high precision outer cylinder alignment element 100 of FIG. 1.

As shown in FIGS. 1 and 3, the ferrule 20 is a single-bore ferrule. The optical fiber 30 is inserted into the bore 21 of the ferrule 20. In an exemplary embodiment, as shown in FIGS. 1 and 3, the diameter of the bore 21 of the ferrule 20 is much larger than the diameter of the fiber 30, so that the fiber 30 can be easily inserted into the bore 21 of the ferrule 20. In this way, it can reduce the cost of the ferrule 20, because it does not need to provide a high precision ferrule with a high precision bore accurately matched with the fiber 30. However, since the diameter of the bore 21 of the ferrule 20 is much larger than the diameter of the fiber 30, it is difficult to ensure the position precision of the fiber 30 in the bore 21 of the ferrule 20, that is, it is difficult to position the center of the fiber core 32 (see FIG. 6) of the fiber 30 at a theoretical center relative to the outer cylinder of the ferrule 20.

Figure 2A:
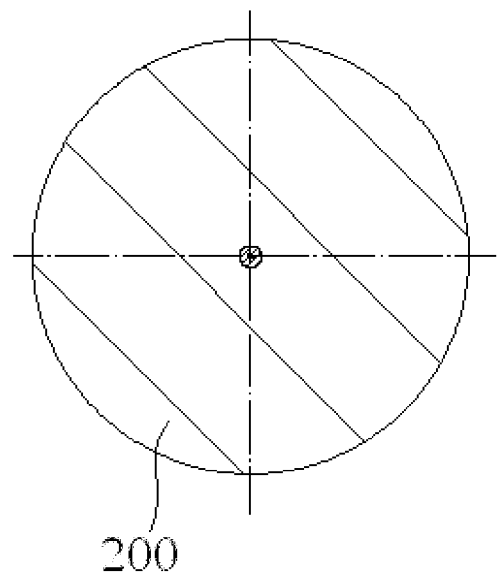
FIGS. 2A and 2B show an enlarged lateral cross section view and an enlarged longitudinal cross section view of the high precision fiber core alignment element of FIG. 1 and a high precision calibration ferrule for fixing the high precision fiber core alignment, respectively.
Figure 2B:
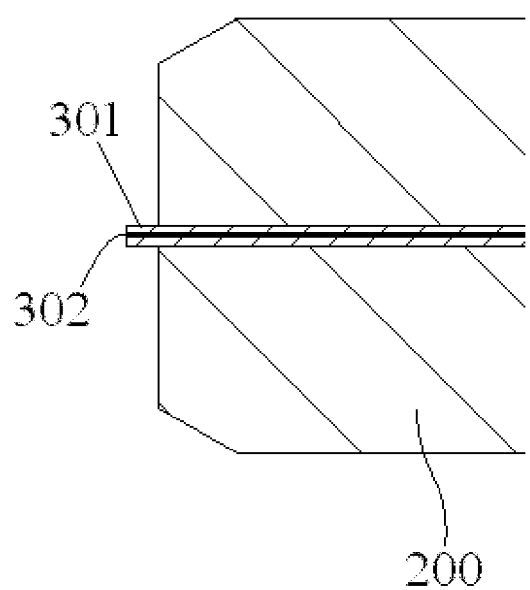

FIGS. 2A and 2B show an enlarged lateral cross section view and an enlarged longitudinal cross section view of the high precision fiber core alignment element 300 of FIG. 1 and a high precision calibration ferrule 200 for fixing the high precision fiber core alignment 300, respectively.

In an exemplary embodiment, as shown in FIGS. 1-3, the high precision fiber core alignment element 300 is fixed in a bore of the high precision calibration ferrule 200. As shown in FIG. 2B, the high precision fiber core alignment element 300 comprises a fiber core 302 and a coating layer 301 covered on the fiber core 302. In an embodiment, a center of the fiber core 302 of the high precision fiber core alignment element 300 is aligned with the center of the outer cylinder of the high precision calibration ferrule 200.

Referring to FIGS. 1-3 again, in an embodiment, the high precision outer cylinder alignment element 100 is configured to be an alignment sleeve, and the high precision calibration ferrule 200 and the ferrule 20 are inserted into the alignment sleeve from both ends thereof, respectively. In this way, the center of the outer cylinder of the ferrule 20 is aligned with the center of the high precision outer cylinder alignment element 100, so that the center of the outer cylinder of the ferrule 20 is aligned with the center of the outer cylinder of the high precision calibration ferrule 200, for example, an error between the center of the outer cylinder of the ferrule 20 and the center of the outer cylinder of the high precision calibration ferrule 200 is controlled within a range of −0.001 mm~0.001 mm, preferably, within a range of −0.3 μm~0.3 μm.

As shown in FIGS. 1 and 3, after the high precision calibration ferrule 200 is inserted into the high precision outer cylinder alignment element 100, the core of the fiber core 302 of the high precision fiber core alignment element 300 is aligned with the center of the high precision outer cylinder alignment element 100.

As described above, since the diameter of the bore 21 in the ferrule 20 is much larger than the diameter of the optical fiber 30, it is difficult to ensure that the center of the fiber core 32 of the fiber 30 is aligned with the center of the outer cylinder of the ferrule 20 after the optical fiber 30 is inserted into the bore 21 of the ferrule 20. That is, it is difficult to ensure that the center of the fiber core 32 of the optical fiber 30 is aligned with the center of the fiber core 302 of the high precision fiber core alignment element 300.

Figure 4:
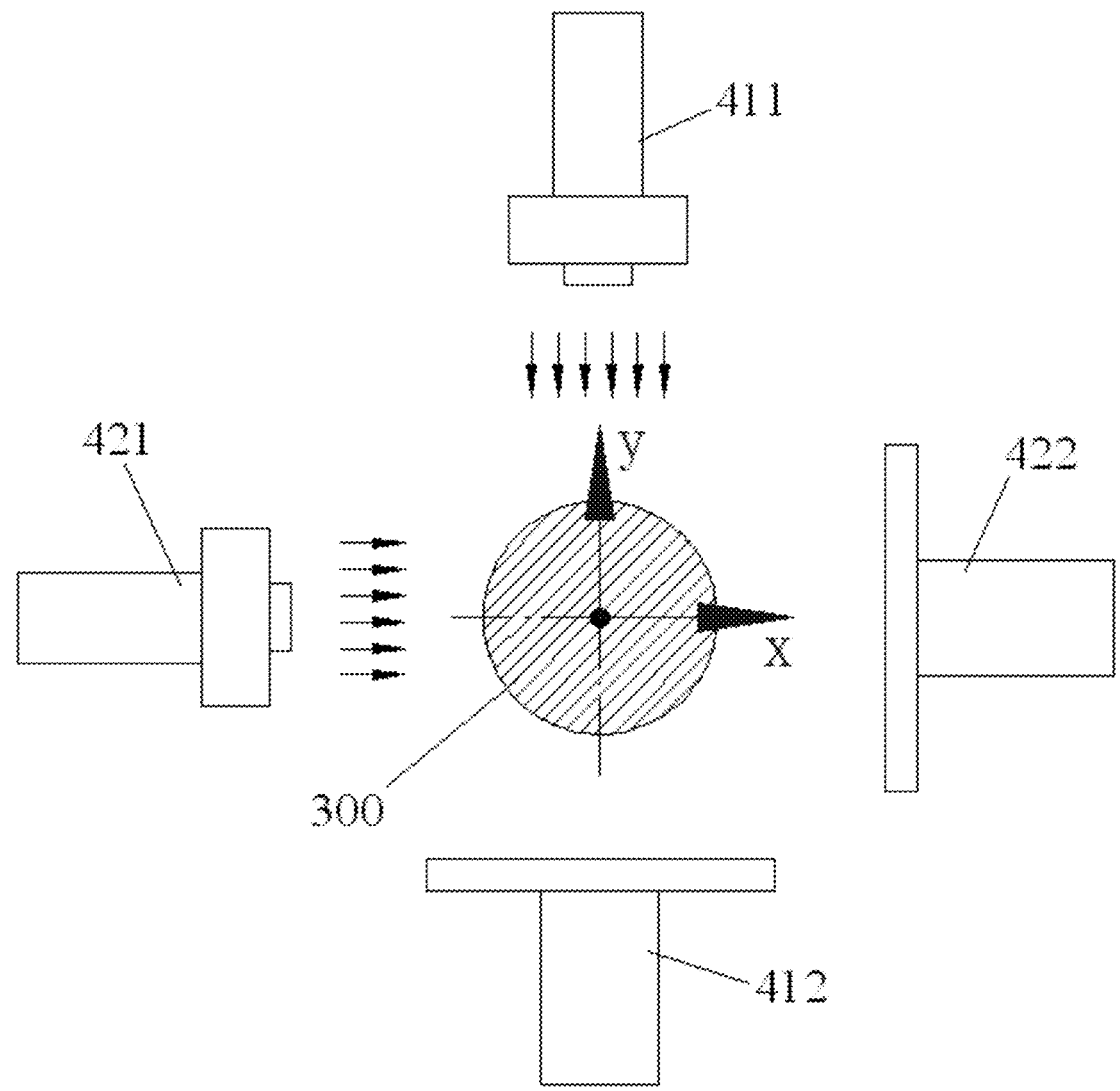
FIG. 4 is an illustrative view of an optical vision system of an alignment system according to an exemplary embodiment of the present invention.
Figure 5A:
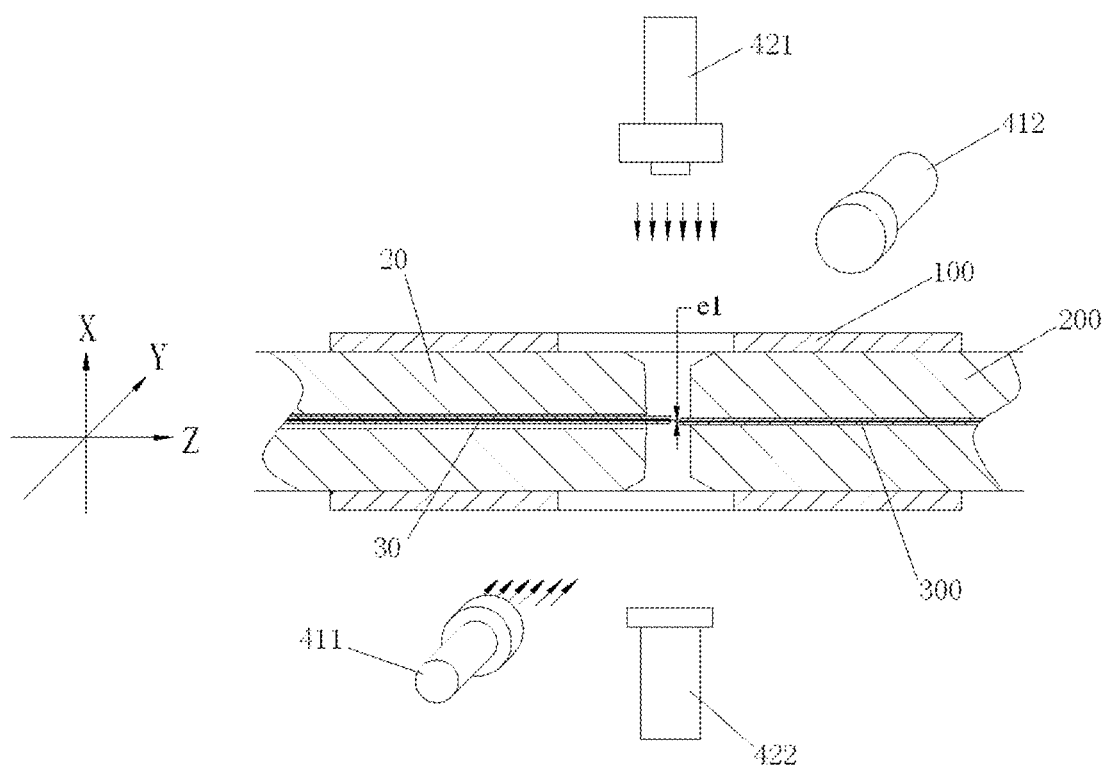
FIG. 5A is an illustrative view of picking up a first image of the fiber and the fiber core alignment element in a first direction (a vertical direction Y shown in FIG. 4) by means of the optical vision system of FIG. 4.
Figure 5B:
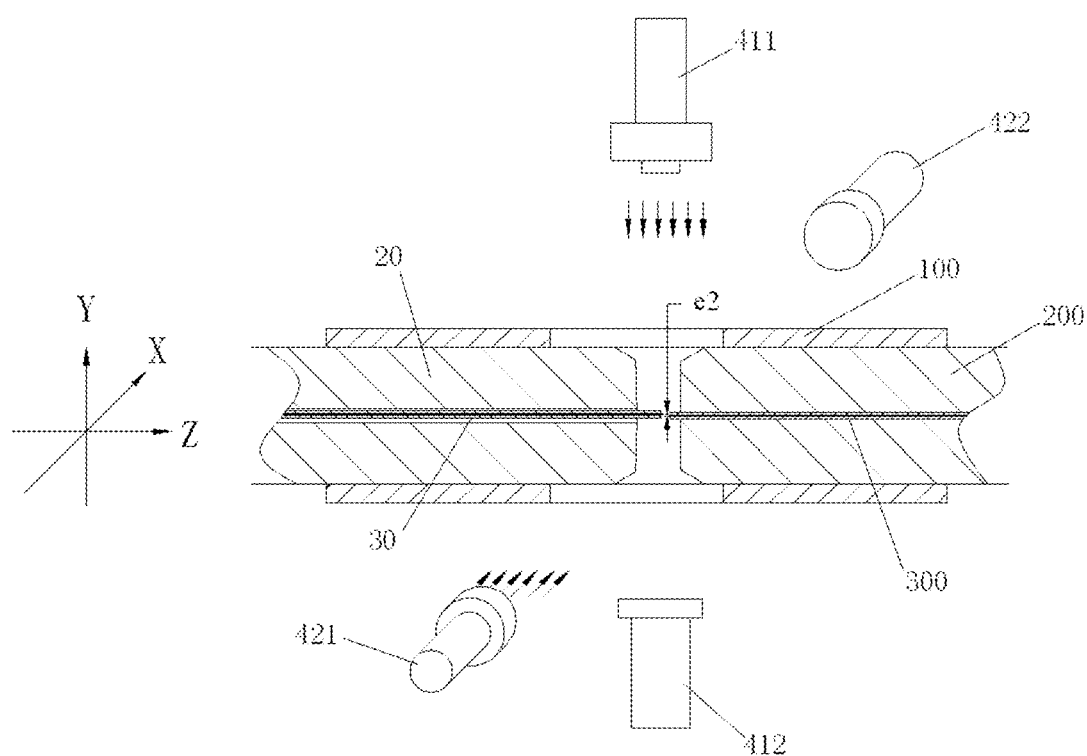
FIG. 5B is an illustrative view of picking up a second image of the fiber and the fiber core alignment element in a second direction (a horizontal direction X shown in FIG. 4) by means of the optical vision system of FIG. 4.

FIG. 5A is an illustrative view of picking up a first image of the fiber 30 and the fiber core alignment element 300 in a first direction (a vertical direction Y shown in FIG. 4) by means of the optical vision system of FIG. 4; FIG. 5B is an illustrative view of picking up a second image of the fiber 30 and the fiber core alignment element 300 in a second direction (a horizontal direction X shown in FIG. 4) by means of the optical vision system of FIG. 4.

In an example, as shown in FIG. 5A, there is a first error e1 between the center of the fiber core 32 of the optical fiber 30 and the center of the fiber core 302 of the high precision fiber core alignment element 300; as shown in FIG. 5B, there is a second error e2 between the center of the fiber core 32 of the optical fiber 30 and the center of the fiber core 302 of the high precision fiber core alignment element 300.

Therefore, in order to align the center of the fiber core 32 of the optical fiber 30 to the center of the fiber core 302 of the high precision fiber core alignment element 300, in an embodiment of the present invention, the controlling and moving system actively adjusts the position of the optical fiber 30 in the bore 21 of the ferrule 20 under the guide of the optical vision system until the first error e1 and the second error e2 are adjusted to be equal to zero or within a predetermined range. In an example, the predetermined range may be a range of −0.001 mm~0.001 mm, preferably, a range of −0.3 μm~0.3 μm. In this way, the center of the fiber core 32 of the optical fiber 30 is aligned with the center of the fiber core 302 of the high precision fiber core alignment element 300, so that the center of the fiber core 32 of the optical fiber 30 is aligned with the center of the outer cylinder of the ferrule 20.

FIG. 5A and FIG. 5B show the first error e1 and the second error e2 between the center of the fiber core 32 of the optical fiber 30 and the center of the fiber core 302 of the high precision fiber core alignment element 300 in two two-dimensional planes perpendicular to each other and parallel to the center axis of the high precision outer cylinder alignment element 100, respectively. That is, a straight error e between the center of the fiber core 32 of the optical fiber 30 and the center of the fiber core 302 of the high precision fiber core alignment element 300 may be calculated according to the following expression (1).

$$e=\sqrt{e_1^2+e_2^2} \qquad (1)$$

Therefore, in order to align the center of the fiber core 32 of the optical fiber 30 to the center of the fiber core 302 of the high precision fiber core alignment element 300, in another embodiment of the present invention, the controlling and moving system actively adjusts the position of the optical fiber 30 in the bore 21 of the ferrule 20 under the guide of the optical vision system until the error e is adjusted to be equal to zero or within a predetermined range. In an example, the predetermined range may be a range of −0.001 mm~0.001 mm, preferably, a range of −0.3 μm~0.3 μm.

Hereafter, it will describe the process to actively adjust the position of the optical fiber 30 in the bore 21 of the ferrule 20 according to an exemplary embodiment with reference to FIGS. 4-8.

FIG. 4 is an illustrative view of an optical vision system of an alignment system according to an exemplary embodiment of the present invention.

As shown in FIG. 4, the optical vision system at least comprises: a first imaging device 411, 412 configured to capture a first image of the optical fiber 30 and the high precision fiber core alignment element 300 in the first direction Y perpendicular to the center axis of the high precision outer cylinder alignment element 100; a second imaging device 421, 422 configured to capture a second image of the optical fiber 30 and the high precision fiber core alignment element 300 in the second direction X perpendicular to the center axis of the high precision outer cylinder alignment element 100 and the first direction Y; and an image recognition device (not shown, for example, a computer) configured to recognize the center position of the fiber core 32 of the optical fiber 30 and the center position of the fiber core 302 of the fiber core alignment element 300 in the first image and recognize the center position of the fiber core 32 of the optical fiber 30 and the center position of the fiber core 302 of the fiber core alignment element 300 in the second image.

In an exemplary embodiment of the present invention, as shown in FIG. 4, the first imaging device 411, 412 comprises: a first light source 411 provided at one side of the outer cylinder alignment element 100 in the first direction Y; and a first camera 412 provided at the other side, opposite to the first light source 411, of the outer cylinder alignment element 100 in the first direction Y. The second imaging device 421, 422 comprises: a second light source 421 provided at one side of the outer cylinder alignment element 100 in the second direction X; and a second camera 422 provided at the other side, opposite to the second light source 421, of the outer cylinder alignment element 100 in the second direction X.

Please be noted that the present invention is not limited to the illustrated embodiments, the optical vision system may further comprise a third imaging device similar to the first and second imaging devices. That is, the optical vision system may comprise three, four or more imaging devices similar to the first and second imaging devices.

Figure 6:
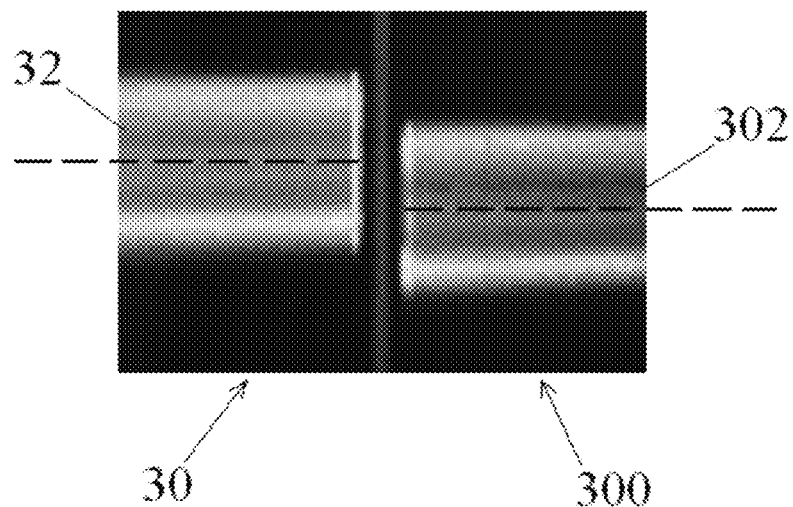
FIG. 6 shows the first image of the fiber and the fiber core alignment element captured by the optical vision system of FIG. 4 in the first direction (a vertical direction Y shown in FIG. 4)

FIG. 5A shows an illustrative view of picking up a first image of the fiber 30 and the fiber core alignment element 300 in a first direction (a vertical direction Y shown in FIG. 4) by means of the optical vision system of FIG. 4. FIG. 6 shows the first image of the ends of the fiber 30 and the fiber core alignment element 30 captured by the first imaging device 411, 412 in the first direction Y.

As shown in FIG. 5A, an end of the optical fiber 30 protrudes from an end surface of the ferrule 20, and an end of the fiber core alignment element 300 protrudes from an end surface of the calibration ferrule 200. The end of the fiber core alignment element 300 faces and is spaced from the end of the optical fiber 30. The first imaging device 411, 412 is configured to pick up an image of the optical fiber 30 and the fiber core alignment element 300 in the first direction Y, so as to obtain the first image as shown in FIG. 6.

As shown in FIG. 6, in the first image, the center (indicated by dash line in FIG. 6) of the fiber core (a brightening part) 32 of the optical fiber 30 offsets from the center (indicated by dash line in FIG. 6) of the fiber core (a brightening part) 302 of the high precision fiber core alignment element 300, that is, there is an error e1 between the center of the fiber core 32 of the optical fiber 30 and the center of the fiber core 302 of the high precision fiber core alignment element 300. Please be noted that the fiber core is made of a material different from the coating layer on the fiber, thereby, the fiber core and the coating layer may be clearly distinguished from each other in the first image. If required, the image recognition device may comprise an image processing system for processing the first image, so that the border of the fiber bore is more clearly distinguished from the border of the coating layer. In this way, it can easily recognize the center of the fiber core of the optical fiber 30 and the center of the fiber core of the high precision fiber core alignment element 300.

After recognizing the center of the fiber core 32 of the optical fiber 30 and the center of the fiber core 302 of the high precision fiber core alignment element 300, the controlling and moving system may actively adjust the position of the optical fiber 30 in the bore of the ferrule 20 under the guide of the optical vision system until the first error e1 and the second error e2, detected in the first image and the second image, between the center of the fiber core 32 of the optical fiber 30 and the center of the fiber core 302 of the high precision fiber core alignment element 300 are adjusted to be equal to zero or within the predetermined range.

Figure 7:
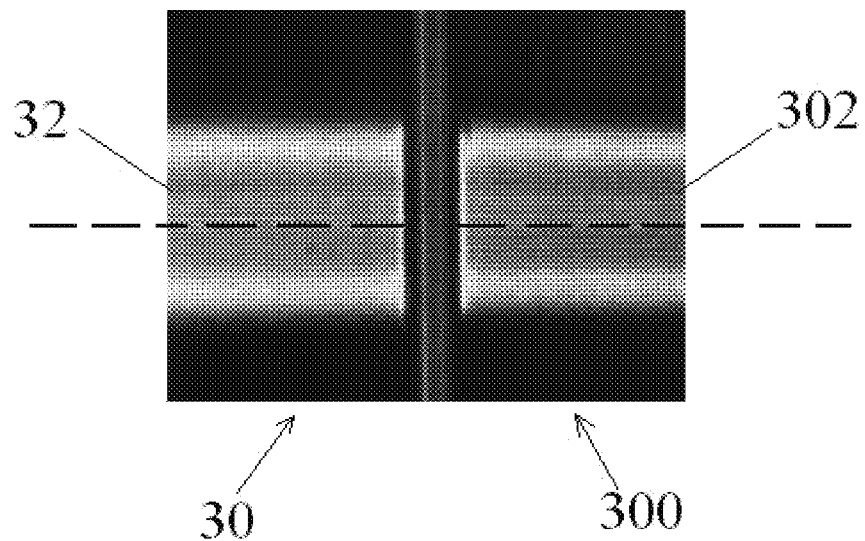
FIG. 7 shows an image of the fiber and the fiber core alignment element after a center of a fiber core of the fiber is actively adjusted to align with a center of a fiber core of the fiber core alignment element.

For example, FIG. 7 shows an image of the fiber 30 and the fiber core alignment element 300 after the center (indicated by dash line in FIG. 7) of the fiber core 32 of the fiber 30 is actively adjusted to align with the center (indicated by dash line in FIG. 7) of the fiber core 302 of the fiber core alignment element 300.

In order to move the optical fiber 30 in high precision, in an exemplary embodiment, the controlling and moving system may comprise a manipulator (not shown, for example a multi-freedom robot) and a closed loop feedback control system. In an embodiment, the manipulator has a gripper for gripping the optical fiber 30. The closed loop feedback control system is configured to adjust the position of the gripper until the error, detected by the optical vision system, between the center position of the fiber core 32 of the optical fiber 30 and the center position of the fiber core 302 of the fiber core alignment element 300 is equal to zero or within the predetermined range.

Figure 8:
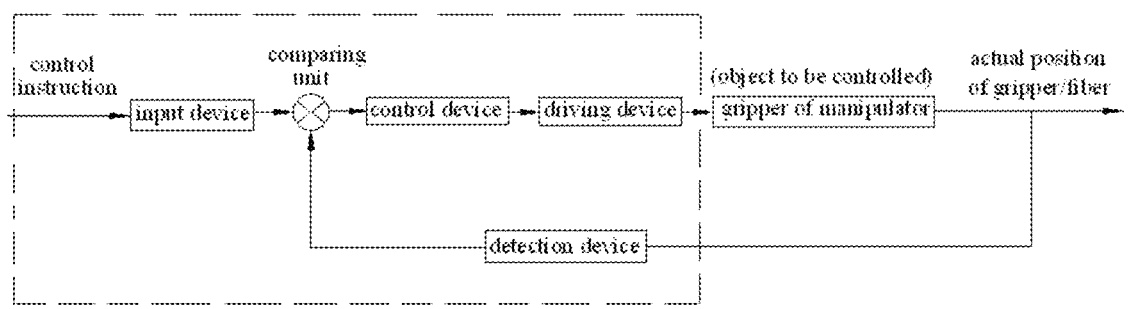
FIG. 8 is an illustrative view of a closed loop feedback control system for controlling a manipulator according to an exemplary embodiment of the present invention.

FIG. 8 is an illustrative view of the closed loop feedback control system for controlling the manipulator according to an exemplary embodiment of the present invention.

As shown in FIG. 8, the closed loop feedback control system may comprise an input device, a control device, a driving device and a detection device. The detection device, for example, the optical vision system, is configured to detect an actual position of the fiber/gripper. The control device is configured to control operation of the driving device.

The driving device is configured to drive the gripper (an object to be controlled) of the manipulator to move. A control instruction (a target position of the fiber/gripper) is input into the control system, and an error between the target position and the actual position of the fiber/gripper is obtained in a comparing unit. Since a position closed loop feedback control system is a typical control system, and its description is omitted herein.

According to another exemplary embodiment of the present invention, there is also disclosed a method of calibrating a position of an optical fiber in a bore of a ferrule, comprising steps of:

providing a high precision high precision outer cylinder alignment element 100 and a high precision fiber core alignment element 300, wherein a center of a fiber core 302 of the high precision fiber core alignment element 300 is aligned with a center of the high precision outer cylinder alignment element 100;

calibrating a center position of an outer cylinder of the ferrule 20 with the high precision outer cylinder alignment element 100, so that a center of the outer cylinder of the ferrule 20 is aligned with the center of the high precision outer cylinder alignment element 100; and actively adjusting the position of the optical fiber 30 in the bore 21 of the ferrule 20 under the guide of an optical vision system, so that a center of a fiber core 32 of the optical fiber 30 is aligned with the center of the fiber core 302 of the high precision fiber core alignment element 300.

According to another exemplary embodiment of the present invention, there is also provided a method of manufacturing a fiber optic ferrule assembly comprising a ferrule 20 and an optical fiber 30 in a bore 21 of the ferrule 20, the method comprising steps of:

calibrating a position of the optical fiber 30 in the bore 21 of the ferrule 20 by means of the above alignment system or the above method, so that a center of a fiber core 32 of the optical fiber 30 is aligned with a center of an outer cylinder of the ferrule 20; and fixing the optical fiber 30 in the bore 21 of the ferrule 20 with a curable adhesive.

According to another exemplary embodiment of the present invention, there is also disclosed a fiber optic ferrule assembly comprising a ferrule 20 and an optical fiber 30 in a bore 21 of the ferrule 20, wherein the fiber optic ferrule assembly is manufactured by the above method of manufacturing the fiber optic ferrule assembly.

According to another exemplary embodiment of the present invention, there is also disclosed a fiber optic connector comprises a housing and the above fiber optic ferrule assembly mounted in the housing.

According to another exemplary embodiment of the present invention, there is also disclosed an alignment system for calibrating a position of an optical fiber 30 in a bore 21 of a ferrule 20. The alignment system comprises: a high precision fiber core alignment element 300 comprising a fiber core 302 having a center positioned at a theoretical center relative to a positioning reference of the ferrule 20; an optical vision system for identifying a center position of a fiber core 32 of the optical fiber 30 and a center position of the fiber core 302 of the high precision fiber core alignment element 300; and a controlling and moving system for actively adjusting the position of the optical fiber 30 in the bore 21 of the ferrule 20 under the guide of the optical vision system, so that the center of the fiber core 32 of the optical fiber 30 is aligned with the center of the fiber core 302 of the high precision fiber core alignment element 300.

According to another exemplary embodiment of the present invention, there is also disclosed a method of calibrating a position of an optical fiber 30 in a bore 21 of a ferrule 20, comprising steps of:

providing a high precision fiber core alignment element 300 comprising a fiber core 302 having a center positioned at a theoretical center relative to a positioning reference of the ferrule 20; and actively adjusting the position of the optical fiber 30 in the bore 21 of the ferrule 20 under the guide of an optical vision system, so that a center of a fiber core 32 of the optical fiber 30 is aligned with the center of the fiber core 302 of the high precision fiber core alignment element 300.

In the prior art, the single-mode fiber optic connector must be manufactured by using the high precision single-mode ferrule, and the multi-mode fiber optic connector may be manufactured by using the low precision multi-mode ferrule. Thereby, in the prior art, it is necessary to differentiate the high precision single-mode ferrule and the low precision multi-mode ferrule during manufacturing the single-mode fiber optic connector and the multi-mode fiber optic connector. Different from the prior art, in the embodiments of the present invention, the single-mode fiber optic connector is also manufactured by using the low precision ferrule, reducing the cost of the single-mode fiber optic connector.

In the present invention, since the position accuracy of the small diameter single-mode fiber in the large diameter bore of the low precision multi-mode ferrule may be calibrated by the alignment system to reach the position accuracy of the fiber in the bore of the high precision single-mode ferrule, a high precision single-mode optic connector can be manufactured by using the low precision multi-mode ferrule, instead of by using the expensive high precision single-mode ferrule. Thereby, the present invention decreases the cost of the high precision single-mode optic connector.

Furthermore, as described above, since the diameter of the bore of the low precision multi-mode ferrule is much larger than the diameter of the bore of the single-mode fiber, the small diameter single-mode fiber may be easily and smoothly inserted into the large diameter bore of the low precision multi-mode ferrule, improving the insertion efficiency of the fiber.

In the present invention, the position precision of the fiber in the bore of the ferrule may be controlled, predicted, and repeated. It may reduce or even eliminate various disadvantageous effects due to the random error of the diameter of the coating layer on the fiber, the random error of different batches of fibers, the random eccentric error between the coating layer and the fiber core. Thereby, the present invention improves the optical performance and the random matching performance of the fiber optic connectors, that is, the coupled fiber optic connectors have ultra-low insertion loss and ultra-low matching insertion loss.

In the present invention, by actively calibrating the position of the fiber core of the optical fiber in the large bore of the low precision multi-mode ferrule, a single-mode fiber optic connector with low cost, high precision and low insertion loss may be manufactured by using the low precision multi-mode ferrule.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An alignment system for calibrating a position of an optical fiber in a bore of a ferrule, the optical fiber having light transmission path along a center axis of the optical fiber, the alignment system comprising:
    an outer cylinder alignment element including a first end and a second end, wherein the first end receives a calibration ferrule that houses a fiber core alignment element having a fixed center axis and presenting a fixed fiber tip and wherein the second end receives a ferrule that houses an optical fiber, the optical fiber being unfixed within a bore of the ferrule and the optical fiber presenting a fiber tip opposite the fixed fiber tip;
    an optical vision system that includes:
        a first light source directed, in a first direction, towards the opposing fiber tip of the optical fiber and the fixed fiber tip of the fiber core alignment element within the outer cylinder alignment element, wherein the first direction is perpendicular to the center axis of the optical fiber; and
        a first imaging device positioned opposite the first light source, wherein the first imaging device produces a first image of the opposing fiber tip of the optical fiber and the fixed fiber tip within the outer cylinder alignment element based on light received from the first light source; and
    a controlling and moving system that actively adjusts a position of the optical fiber in the bore of the ferrule to align the fiber tip and central axis of the optical fiber with the fixed fiber tip and central axis of the fiber core alignment element within the outer cylinder alignment element based on the detected first image.

2. The alignment system according to claim 1, wherein the optical vision system further includes:
    a second light source directed, in a second direction, towards the opposing fiber tip of the optical fiber and the fixed fiber tip of the fiber core alignment element within the outer cylinder alignment element, wherein the second direction is perpendicular to the center axis of the optical fiber and is different from the first direction; and
    a second imaging device positioned opposite the second light source, wherein the second imaging device produces a second image of the opposing fiber tip of the optical fiber and the fixed fiber tip of the fiber core alignment element within the outer cylinder alignment element based on the light received from the second light source; and
    wherein the controlling and moving system actively adjusts the position of the optical fiber in the bore of the ferrule to align the fiber tip and central axis of the optical fiber with the fixed fiber tip and central axis of the fiber core alignment element within the outer cylinder alignment element based on the detected second image.

3. The alignment system according to claim 2, wherein the first light source is provided at one side of the outer cylinder alignment element in the first direction and wherein the first imaging device comprises a first camera provided at the other side of the outer cylinder alignment element in the first direction.

4. The alignment system according to claim 3, wherein the second light source provided at one side of the outer cylinder alignment element in the second direction and wherein the second imaging device comprises a second camera provided at the other side of the outer cylinder alignment element in the second direction.

5. The alignment system according to claim 2,
    further comprising an image processing system for processing the first image and the second image.

6. The alignment system according to claim 1, wherein a gap exists between the opposing fiber tip of the optical fiber and the fixed fiber tip of the fiber core alignment element within the outer cylinder alignment element.

7. The alignment system according to claim 2,
    wherein a light transmission window is formed on a peripheral wall of the outer cylinder alignment element enabling transmission of light emitted from the first and second light sources there through.

8. The alignment system according to claim 2,
    wherein an entirety of the outer cylinder alignment element is of transparent material enabling transmission of light emitted from the first and second light sources there through.

9. The alignment system according to claim 1, wherein the controlling and moving system comprises:
    a manipulator having a gripper that grips the optical fiber; and
    a closed loop feedback control system that adjusts a position of the gripper until an error, detected by the optical vision system, of alignment of the fiber tip of the optical fiber relative to the fixed fiber tip of the fiber core alignment element is within a predetermined range.

10. The alignment system according to claim 9, wherein the predetermined range is a range of −0.001 mm~0.001 mm.

11. The alignment system according to claim 9, wherein the predetermined range is a range of −0.3 μπι~0.3 μπι.

12. A method of calibrating a position of an optical fiber in a bore of a ferrule, the optical fiber having a light transmission path along a center axis of the optical fiber, the method comprising:
  inserting a calibration ferrule into a first end of an outer cylinder alignment element, wherein the calibration ferrule houses a fiber core alignment element presenting a fixed fiber tip having a fixed center axis;
  inserting a ferrule into a second end of the outer cylinder alignment element, wherein the ferrule houses an optical fiber, the optical fiber being unfixed within a bore of the ferrule and the optical fiber presenting a fiber tip opposite the fixed fiber tip of the calibration ferrule;
  directing light in a first direction towards the opposing fiber tip of the optical fiber and the fixed fiber tip of the fiber core alignment element within the outer cylinder alignment element, wherein the first direction is perpendicular to the center axis of the optical fiber;
  receiving the light directed in the first direction and generating a first image of the opposing fiber tip of the optical fiber and the fixed fiber tip of the fiber core alignment element within the outer cylinder alignment element based on the received light; and
  adjusting a position of the optical fiber in the bore of the ferrule to align the fiber tip and center axis of the optical fiber with the fixed fiber tip and central axis of the fiber core alignment element within the outer cylinder alignment element based on the generated first image.

13. The method according to claim 12, further comprising:
  directing light in a second direction towards the opposing fiber tip of the optical fiber and the fixed fiber tip of the fiber core alignment element within the outer cylinder alignment element, wherein the second direction is perpendicular to the center axis of the optical fiber and the second direction is different from the first direction;
  receiving the light directed in the second direction and generating a second image of the opposing fiber tip of the optical fiber and the fixed fiber tip of the fiber core alignment element within the outer cylinder alignment element based on the received light of the second direction.

14. The method according to claim 13, further comprising:
  adjusting a position of the optical fiber in the bore of the ferrule to align the fiber tip and center axis of the optical fiber with the fixed fiber tip and central axis of the fiber core alignment element within the outer cylinder alignment element based on the generated image from the light directed in the second direction.

15. The method according to claim 12, wherein a gap exists between the opposing fiber tip of the optical fiber and the fixed fiber tip of the fiber core alignment element within the outer cylinder alignment element.

16. The method according to claim 12,
  wherein the position of the optical fiber in the bore of the ferrule is adjusted by:
  gripping the optical fiber; and
  moving the gripped fiber in response to an error feedback, the error feedback indicating an error of alignment of the fiber tip of the optical fiber relative to the fixed fiber tip of the fiber core alignment element.

* * * * *